US012736385B2

(12) United States Patent
Stolz et al.

(10) Patent No.: US 12,736,385 B2
(45) Date of Patent: Sep. 15, 2026

(54) FILL LEVEL GAUGE

(71) Applicant: Endress+Hauser SE+Co. KG, Maulburg (DE)

(72) Inventors: Lars Stolz, Eimeldingen (DE); Robert Schmidt, Schopfheim (DE); Gerd Bechtel, Steinen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 233 days.

(21) Appl. No.: 18/847,468

(22) PCT Filed: Mar. 13, 2023

(86) PCT No.: PCT/EP2023/056275
§ 371 (c)(1),
(2) Date: Sep. 16, 2024

(87) PCT Pub. No.: WO2023/180109
PCT Pub. Date: Sep. 28, 2023

(65) Prior Publication Data

US 2025/0216243 A1 Jul. 3, 2025

(30) Foreign Application Priority Data

Mar. 22, 2022 (DE) ..................... 10 2022 106 671.1

(51) Int. Cl.
*G01F 23/24* (2006.01)
*G01F 23/26* (2022.01)
(Continued)

(52) U.S. Cl.
CPC .......... *G01F 23/241* (2013.01); *G01F 23/268* (2013.01); *G01F 23/2962* (2013.01);
(Continued)

(58) Field of Classification Search
CPC .. G01F 23/241; G01F 23/268; G01F 23/2962; G01F 23/24; G01F 23/248; G01F 23/26; G01F 23/22
(Continued)

(56) References Cited

U.S. PATENT DOCUMENTS 5,975,102 A 11/1999 Schalk
10,072,960 B2 9/2018 Muzzo et al.
(Continued)

FOREIGN PATENT DOCUMENTS

DE 3046915 A1 7/1982
DE 102010030229 A1 4/2013
(Continued)

*Primary Examiner* — Peter J Macchiarolo
*Assistant Examiner* — John M Royston
(74) *Attorney, Agent, or Firm* — Mark A. Logan; Endress+Hauser Holding (USA), Inc.

(57) ABSTRACT

An electrical assembly for an electrical fill level measuring device for measuring a fill level of a medium in a containment comprises an electrically conductive probe having a plastic coating in a central region and a process connection. The probe is seated by means of a rotationally symmetric, especially ring shaped or tubular, seal radially relative to the process connection. The seal is connected with the plastic coating by material bonding by means of a weld method. The probe is seated radially and/or axially in a housing near end region by a seating means rotationally fixed in at least one rotational direction.

11 Claims, 3 Drawing Sheets

(51) Int. Cl.
*G01F 23/263* (2022.01)
*G01F 23/2962* (2022.01)

(52) U.S. Cl.
CPC ............ *G01F 23/24* (2013.01); *G01F 23/248* (2013.01); *G01F 23/26* (2013.01)

(58) Field of Classification Search
USPC ........................................................ 73/304 R
See application file for complete search history.

(56) References Cited

U.S. PATENT DOCUMENTS

| | | | | |
|---|---|---|---|---|
| 2005/0150568 | A1 * | 7/2005 | Dietmeier .......... | H01R 13/5202 141/95 |
| 2014/0125512 | A1 | 5/2014 | Janitch | |

FOREIGN PATENT DOCUMENTS

| | | | |
|---|---|---|---|
| DE | 102014111265 | A1 | 12/2018 |
| EP | 1544585 | A2 | 6/2005 |
| EP | 1544585 | B1 | 5/2015 |
| EP | 1597544 | B1 | 4/2019 |
| EP | 2381228 | B1 | 8/2019 |
| EP | 1825231 | B1 | 2/2020 |
| KR | 101401356 | B1 | 6/2014 |

* cited by examiner 70
12.2
1.1
40
10

FILL LEVEL GAUGE

CROSS-REFERENCE TO RELATED APPLICATIONS

The present application is related to and claims the priority benefit of DPMA Patent Application No. 10 2022 106 671.3, filed on Mar. 22, 2022, and International Patent Application No. PCT/EP2023/056275, filed Mar. 13, 2023, the entire contents of which are incorporated herein by reference.

TECHNICAL FIELD

The invention relates to an electrical fill level measuring device, in the case of which a probe is immersed in a medium located in a containment and, via electrical properties, a fill level of the medium is derived.

BACKGROUND

Such fill level measuring devices are known, for example, from patent EP1544585B1. In order that an effective sealing of such fill level measuring devices is achieved, conically formed seals are applied, which, however, in the state of the art are only safely emplaced via complicated means.

SUMMARY

An object of the invention is to provide a fill level measuring device having an easy and safe means for securing and holding a sealing element.

The object is achieved by an electrical assembly, by an electrical fill level measuring device as as well as by a method as defined in the present disclosure.

An electrical assembly of the invention for an electrical fill level measuring device for measuring a fill level of a medium in a containment comprises:

an electrically conductive probe adapted for conducting an electrical signal, wherein the probe is adapted to be immersed into the medium, wherein the probe has in the axial direction a central region as well as two end regions, wherein the probe has a plastic coating in the central region;

a process connection, which is adapted to seat the probe radially, wherein the probe extends sectionally via an open end of the process connection into a lumen of the process connection;

wherein the probe is held radially relative to the process connection by means of a rotationally symmetric, especially ring shaped or tubular, seal, wherein the seal is connected with the plastic coating by material bonding by means of a weld method, especially a mechanical friction welding method, such as, for example, rotational friction welding, rotational vibration welding or ultrasonic welding.

In an embodiment, the probe is seated by means of the seal radially relative to the process connection.

In an embodiment, the seal includes a stop, which is adapted to act against a stop of the process connection.

In an embodiment, the probe is seated radially and/or axially in a medium far end region by a seating means rotationally fixed in at least in one rotational direction.

An axial seating can supplementally or alternatively be arranged via a spring means, which acts, for example, against a radial projection or catch of the probe.

In an embodiment, the seal comprises a thermoplastic or is made of thermoplastic.

In an embodiment, the plastic coating is applied by extrusion onto an electrically conductive core of the probe.

An electrical fill level measuring device of the invention for measuring a fill level of a medium in a containment comprises an electrically conductive probe adapted for conducting an electrical signal, wherein the probe is adapted to be immersed into the medium, wherein the probe has in the axial direction a central region as well as two end regions, wherein the probe has a plastic coating in the central region;

an electronic measuring/operating circuit adapted for producing and evaluating electrical signals as well as for providing fill level measured values;

a housing, in which, for example, the electronic measuring/operating circuit is arranged;

a process connection secured to the housing and adapted to seat the probe radially, wherein the probe extends sectionally via an open end of the process connection into a lumen of the process connection;

wherein the probe is held radially relative to the process connection by means of an especially ring shaped or tubular seal, wherein the seal is connected with the plastic coating by material bonding by means of a weld method, especially a mechanical friction welding method, such as, for example, rotational friction welding, rotational vibration welding or ultrasonic welding.

In an embodiment, the electronic measuring/operating circuit is adapted to derive the fill level of medium from a measured electrical current, or a measured capacitance or a signal travel time of an electrical pulse.

In an embodiment, the electronic measuring/operating circuit is connected with a housing near end region of the probe by means of an electrically conductive terminal apparatus.

In a method of the invention for producing a fill level measuring device of the invention, a probe has in the axial direction a central region with a plastic coating, wherein the method comprises method steps as follows:

in a first method step a rotationally symmetric, for example, ring shaped or tubular, seal is led over an end of the probe to the central region, wherein seal and plastic coating form a press fit with one another, and in a second method step a relative movement, such as, for example, a relative rotational movement, is established between seal and probe, such that seal and plastic coating become sectionally connected together by material bonding as a result of friction.

BRIEF DESCRIPTION OF THE DRAWINGS

The present disclosure will now be described based on examples of embodiments presented in the appended drawing, the figures of which show as follows.

DETAILED DESCRIPTION

Figure 1:
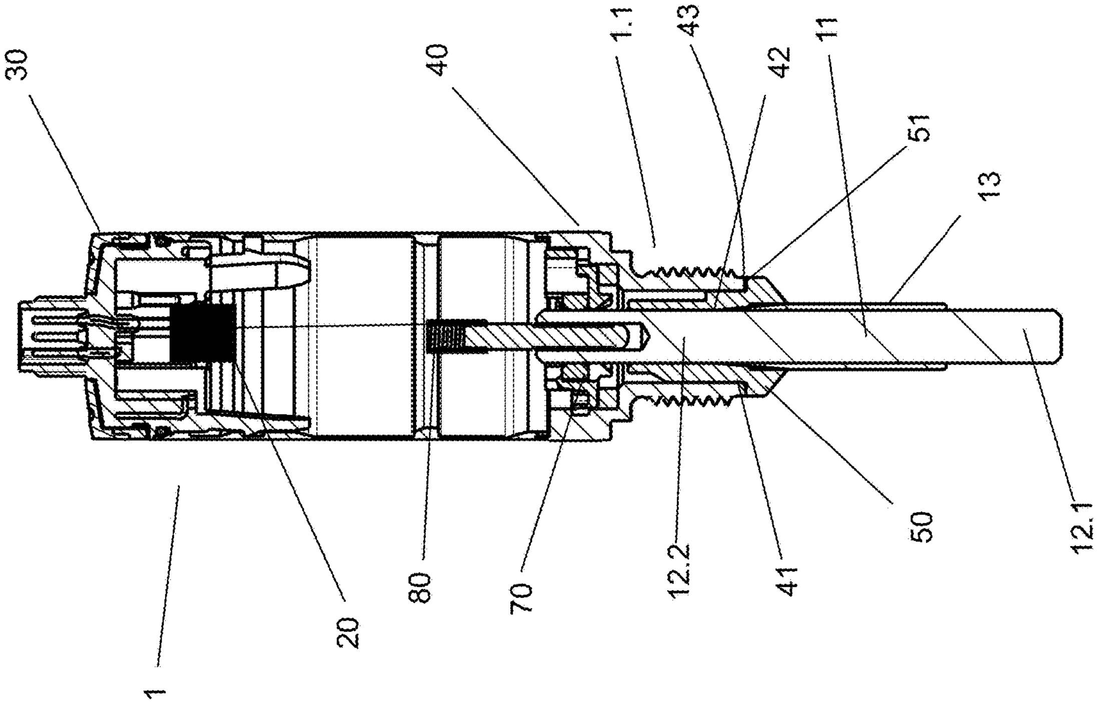
FIG. 1 shows by way of example, two fill level measuring devices of the present disclosure.
Figure 1:
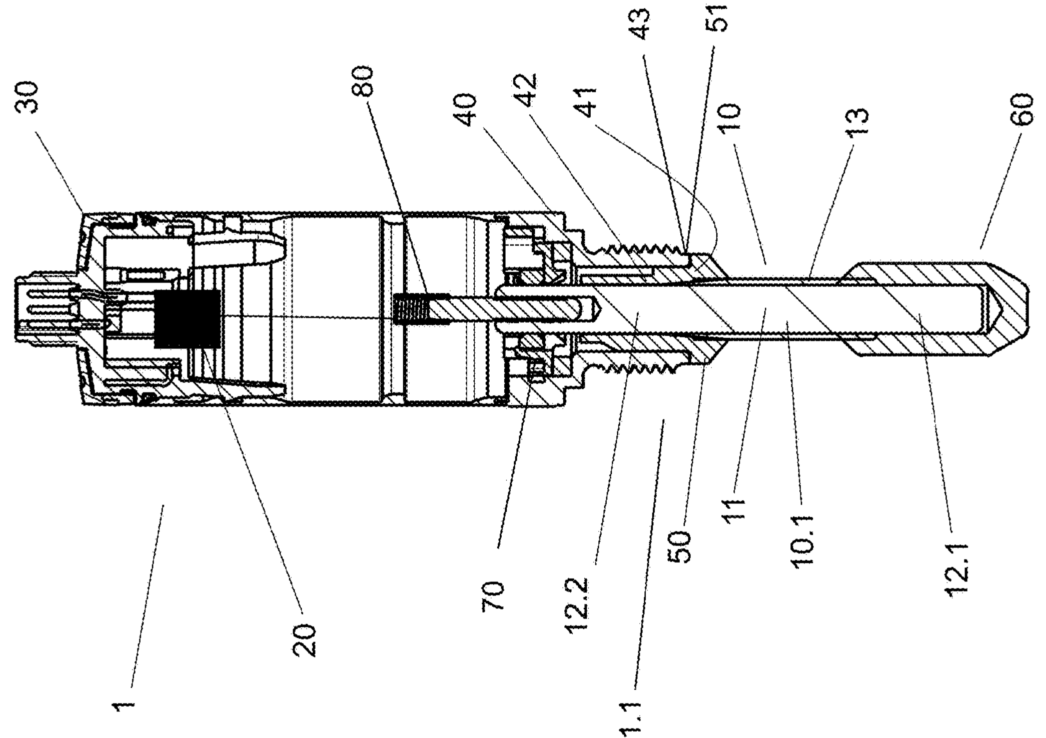

FIG. 1 shows two longitudinal sections through examples of fill level measuring devices 1 of the invention, each having a housing 30, an electronic measuring/operating circuit 20 arranged in the housing, and an example of an assembly 1.1 of the invention with an electrically conductive probe 10 and a process connection 40. Alternatively, the electronic measuring/operating circuit can also be arranged outside of the housing and electrically connected with the probe by means of an interface. The electronic measuring/operating circuit is adapted for producing and evaluating electrical signals as well as for providing fill level measured values.

Process connection 40 is secured to the housing and adapted radially to hold, or seat, the probe 10. The probe can be seated via the process connection axially and/or rotationally in at least one rotational direction. A further radial support point is provded, such as shown here, by the seating means 70. Compare in this connection also FIG. 2. The probe extends via an open end 41 of the process connection into a lumen 42 of the process connection. The process connection is sealed against medium by means of a seal 50.

According to the invention, the probe has a plastic coating 13 in a central region 11 on an electrically conductive probe core 10.1. Furthermore, according to the invention, seal 50 and plastic coating 13 are connected with one another by material bonding by means of a mechanical friction welding method, such as, for example, rotational friction welding, rotational vibration welding or ultrasonic welding.

Seal 50 includes, in such case, a stop 51, which acts against a stop 43 of the process connection.

In the case of a capacitive, fill level measuring device, such as shown on the left side of FIG. 1, the fill level measuring device can have on a housing far end 12.1, such as shown here, an electrical insulator 60, which electrically isolates the medium from the probe. In the case of a conductive, fill level measuring device, such as shown on the right side of FIG. 1, the housing far end 12.1 remains free of an electrically insulating material, such that it can be in electrical contact with the medium.

The electronic measuring/operating circuit can, such as shown here, be connected with a housing near end region of the probe by means of an electrically conductive terminal apparatus.

Figure 2:
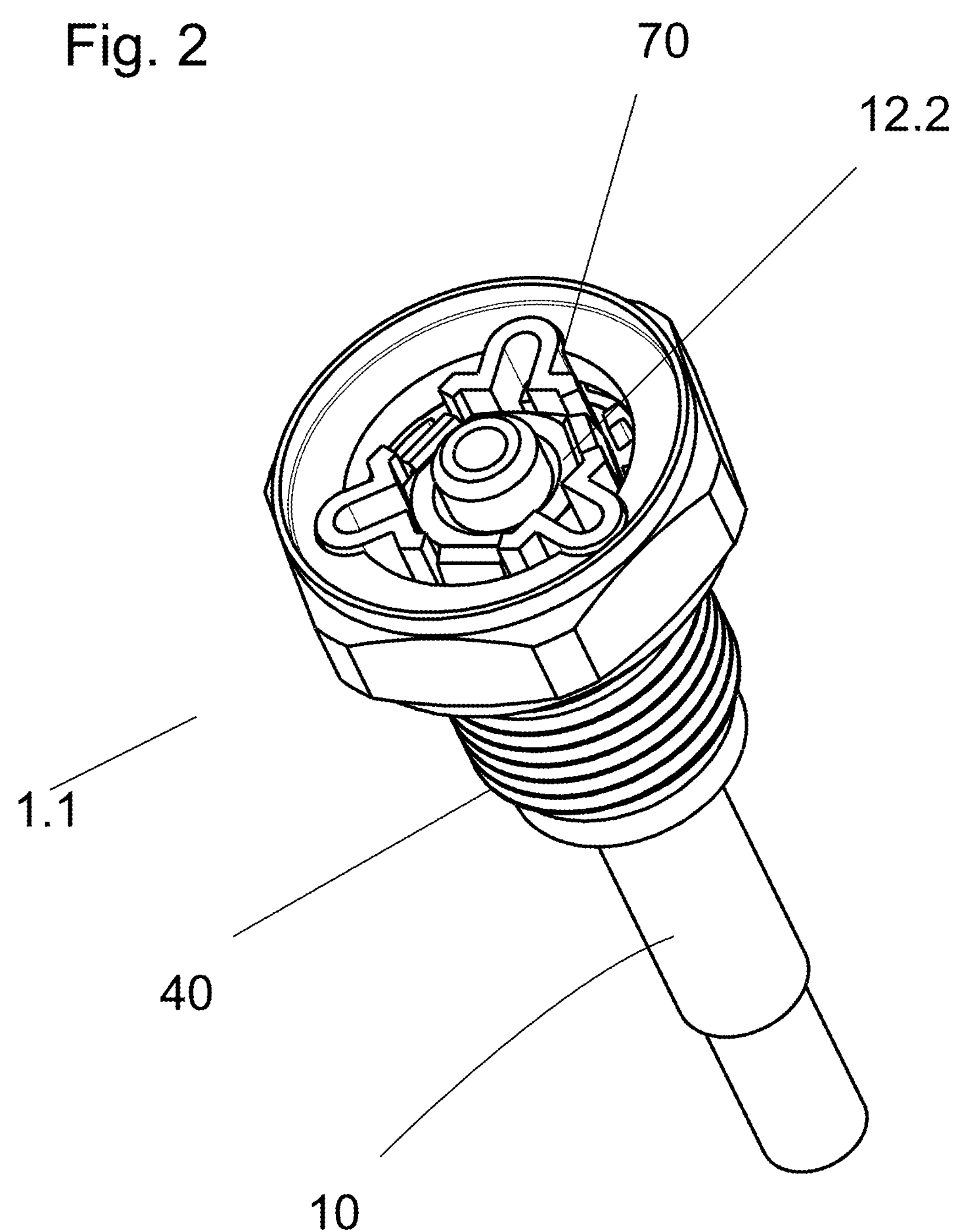
FIG. 2 shows by way of example, an electrical assembly of the present disclosure with a seating means of the probe.

FIG. 2 shows, by way of example, an embodiment of a seating of the probe 10, wherein in the process connection 40 a seating means 70 is provided, which radially and/or axially seats the probe at a housing near end of the probe 12.2. The seating means is secured in the process connection rotationally fixed at least in one rotational direction. It can, however, such as shown here, also be secured rotationally fixed in both rotational directions. An axial seating of the probe can, supplementally or alternatively, be provided via a spring means, which acts, for example, against a radial projection or catch of the probe.

Figure 3:
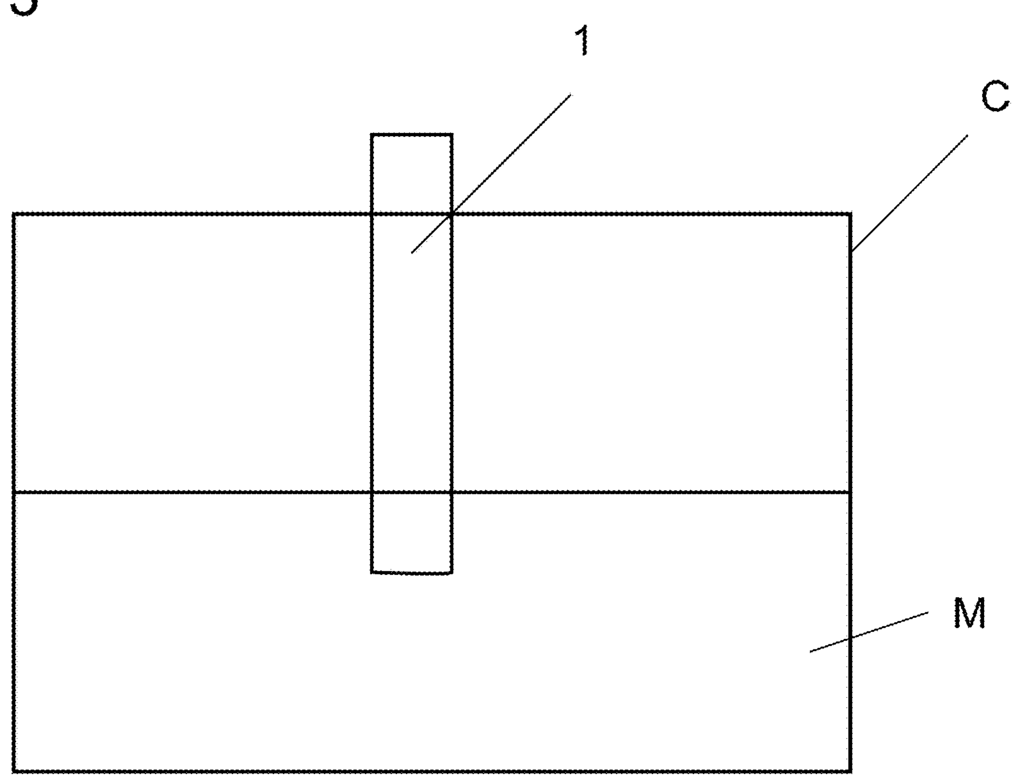
FIG. 3 shows by way of example, an application of a fill level measuring device of the present disclosure.

FIG. 3 shows an application of an example of fill level measuring device 1 secured on a containment C and extending inwardly into a lumen of the containment, such that it immerses partially in a medium located in the containment. Then, for example, the fill level of medium can be determined using conductivity-or capacitance measurements.

Figure 4:
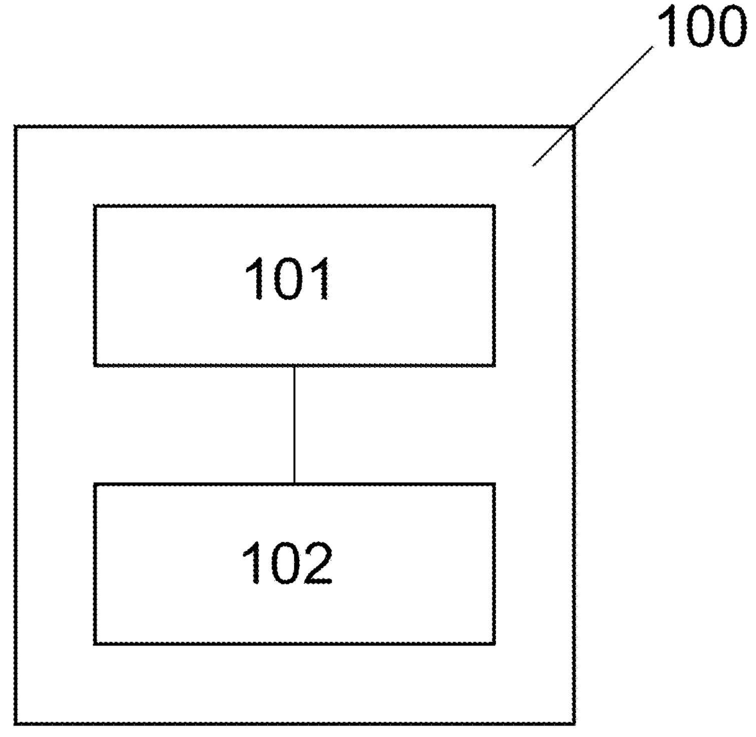
FIG. 4 shows by way of example, a method for producing a fill level measuring device.

FIG. 4 shows a method 100 for producing a fill level measuring device of the invention, wherein a probe 10 is provided in the axial direction central region 11 with a plastic coating 13, wherein in a first method step 101 a rotation symmetric, for example, ring shaped or tubular, seal 50 is led over an end of the probe to the central region, wherein seal and plastic coating form a press fit with one another, and wherein in a second method step 102 a relative movement, such as, for example, a relative rotational movement, is established between seal and probe, such that seal and plastic coating become sectionally connected together by material bonding as a result of friction.

The invention claimed is:

1. An electrical assembly for an electrical fill level measuring device for measuring a fill level of a medium in a containment, the electrical assembly comprising:

an electrically conductive probe adapted for conducting an electrical signal, wherein the electrically conductive probe is adapted to be immersed into the medium, wherein the electrically conductive probe has in an axial direction a central region and two end regions, wherein the probe has a plastic coating in the central region; and a process connection that is adapted to seat the electrically conductive probe radially, wherein the electrically conductive probe extends sectionally via an open end of the process connection into a lumen of the process connection;

wherein the electrically conductive probe is held radially relative to the process connection by a rotationally symmetric seal, and wherein the rotationally symmetric seal is connected with the plastic coating by material bonding by a weld method.

2. The electrical assembly as claimed in claim 1, wherein the electrically conductive probe is seated by the rotationally symmetric seal radially relative to the process connection.

3. The electrical assembly as claimed in claim 1, wherein the rotationally symmetric seal includes a stop that is adapted to act against a stop of the process connection.

4. The electrical assembly as claimed in claim 1, wherein the electrically conductive probe is seated radially and/or axially in a medium far end region by a seating means rotationally fixed in at least one rotational direction.

5. The electrical assembly as claimed in claim 1, wherein the rotationally symmetric seal includes a thermoplastic or is made of the thermoplastic.

6. The electrical assembly as claimed in claim 1, wherein the plastic coating is applied on an electrically conductive probe core of the electrically conductive probe by extrusion.

7. The electrical assembly of claim 1, wherein the weld method includes a mechanical friction welding method, rotational friction welding, rotational vibration welding, or ultrasonic welding.

8. An electrical fill level measuring device for measuring a fill level of a medium in a containment, comprising:

an electrical assembly, including:

an electrically conductive probe adapted for conducting an electrical signal, wherein the electrically conductive probe is adapted to be immersed into the medium, wherein the electrically conductive probe has in an axial direction a central region and two end regions, wherein the probe has a plastic coating in the central region;

a process connection that is adapted to seat the electrically conductive probe radially, wherein the electrically conductive probe extends sectionally via an open end of the process connection into a lumen of the process connection;

wherein the electrically conductive probe is held radially relative to the process connection by a rotationally symmetric seal, wherein the rotationally symmetric seal is connected with the plastic coating by material bonding by a weld method;

an electronic measuring/operating circuit adapted for producing and evaluating electrical signals as well as for providing fill level measured values or a connection for such an electronic measuring/operating circuit; and a housing in which the electronic measuring/operating circuit or the connection for the electronic measuring/operating circuit is arranged.

9. The electrical fill level measuring device as claimed in claim 8, wherein the electronic measuring/operating circuit is adapted to derive the fill level of medium from a measured electrical current, or a measured capacitance or a signal travel time of an electrical pulse.

10. The electrical fill level measuring device as claimed in claim 8, wherein the electronic measuring/operating circuit is connected with a housing near end region of the probe via an electrically conductive terminal apparatus.

11. A method for producing a fill level measuring device, wherein a probe of the fill level measuring device has in the axial direction a central region with a plastic coating, the method comprising:

leading a rotationally symmetric seal over an end of the probe to the central region, wherein seal and the plastic coating form a press fit with one another; and establishing a relative movement between the seal and the probe such that the seal and the plastic coating become sectionally connected together by material bonding as a result of friction.

* * * * *